Oct. 31, 1961 W. R. McDURMONT 3,006,983
UNIVERSAL COMPRESSION CONNECTOR AND METHOD OF CRIMPING SAME
Filed Feb. 11, 1959

INVENTOR
Walter R. McDurmont
BY
Kenyon Kenyon
ATTORNEYS

United States Patent Office 3,006,983
Patented Oct. 31, 1961

3,006,983
UNIVERSAL COMPRESSION CONNECTOR AND METHOD OF CRIMPING SAME
Walter R. McDurmont, Birmingham, Ala., assignor to Anderson Electric Corporation, Birmingham, Ala., a corporation of Alabama
Filed Feb. 11, 1959, Ser. No. 792,600
4 Claims. (Cl. 174—94)

This invention relates to fittings or couplings for joining conductors such as wires or cables of the same or different diameters and to a method of applying such couplings or fittings.

It is conventional to provide compression couplings or fittings for joining wires or cables having the same or different diameters with one portion of the coupling having an inside diameter approximating the outer diameter at one of the cables and a second portion having an inside diameter approximating the outer diameter of the second cable to be joined to the first. This practice has necessitated the production of fittings or couplings having a large range of sizes or diameters for each of the respective portions thereof in order to enable an electrical worker to join various cables or wires in different size ranges. There was a necessity, therefore, for keeping a large stock of differently sized fittings because a joiner or lineman otherwise frequently might find himself lacking the particular coupling required for a specific job and objects to climbing down and returning to the truck. It has become desirable to reduce the number of stock sizes of joining members required to be carried to a job by truck or otherwise to a minimum. This is a principal object and feature of the invention.

The present invention also has among its objects and features the provision of universal couplings, connectors or fittings which are capable of use in uniting cables or wires whose diameters may vary over a wide range, for example, up to a normal diameter ratio of approximately 3:1, and ratios in excess of 3:1 by the use of special tools for crimping.

Other objects and features of the invention are the provision of simple inexpensive universal couplings or fittings.

Further objects and features of the invention are the provision of a novel method of attaching cables or wires to the connectors of this invention.

Other objects and features of the invention are the provision of universal connectors of the character mentioned which provide an electrical connection assembly in which the ribs formed by crimping act as beam sections against which forces applied by expansion of the crimped-in conductor at the bottom of each beam section act to maintain a tight electrical contact. The forces produced by thermal cycling in other types of connector assemblies act to loosen the electrical contact.

Still other objects and features of the invention are the provision of a method of joining the connectors with wires or cables such that temperature variations during use under usual atmospheric conditions will not result in loosening of the joints even though the latter may heat up considerably during passage of electric current and cool well below freezing point temperatures in winter or cold temperature use.

Further objects and features of the invention are the provision of a novel method of crimping or joining the connectors to the cables by a cold working of the metal of the connectors into a pleated or folded configuration when seen in section which on crimping provides relief passages to permit leakage of inhibitor which is contained as a preservative or anti-oxidant in the connectors and thereby provides equalization between the pressure of entrapped inhibitor and environmental atmosphere. Furthermore, the dispersement of the sealant along the equally spaced relief passages provides even distribution around the outer, exposed joint circumference so as to form a protective bead for sealing out moisture and other contamination. This aspect of the invention is of extreme importance because otherwise hydraulic pressure build-up of the inhibitor within the connector may occur on formation of the joint which tends actually to destroy or impede contact of the conductor with the fitting and results in poor electrical conductivity.

Further objects and features of the invention include the provision of a method of crimping which provides substantial self-centering of the cables or wires within the fitting during their union therewith, a feature which is of special importance when there is a wide disparity in the diameters of the conductors joined by a particular fitting.

Further objects and features of the invention are the provision of a method of crimping which augments or enhances the break-up of oxide film on the surface of the conductors during their union with the fitting, thus ensuring good electrical contact between substantial lengths of the fitting and the conductors it joins.

Other objects and features of this invention are to provide an electrical connector assembly in which expansion and contraction of either the crimped connector body or the connected conductor tends at all times to exert greater pressures at the contacting points than were produced by prior crimping procedures.

Other objects and features of the invention will become apparent from the following specification and the accompanying drawing forming a part hereof wherein.

Figure 1:
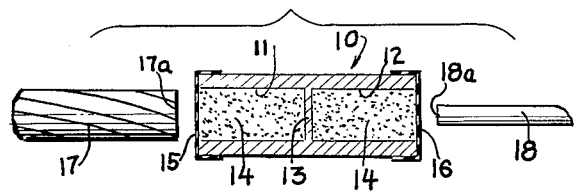
FIG. 1 is a longitudinal section of a universal coupling or fitting embodying the present invention.
Figure 2:
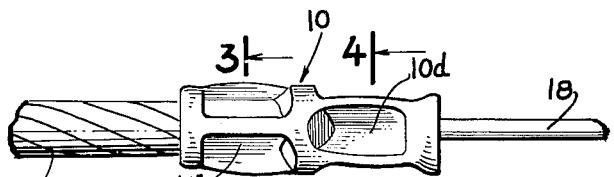
FIG. 2 is a plan view of the coupling or fitting after its union with a pair of differently diametered cables or wires and after crimping has been effected.
Figure 3:
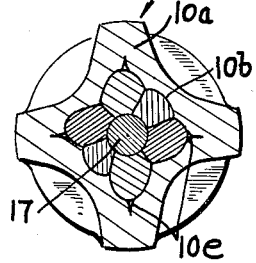
FIG. 3 is a sectional view taken the plane of line 3—3 of FIG. 2.
Figure 4:
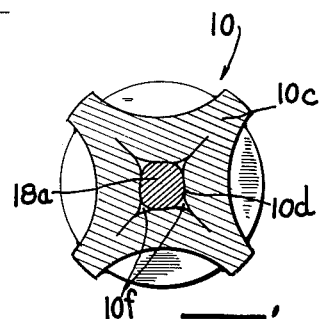
FIG. 4 is a similar sectional view taken along the plane of line 4—4 of FIG. 2.
Figure 5:
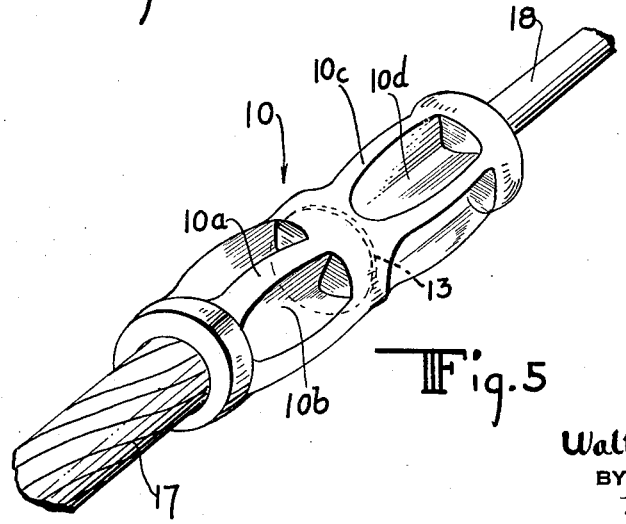
FIG. 5 is a perspective view of a pair of conductors of different dimensions joined by a coupling or fitting of this invention.

Referring now to the drawing, and first to FIG. 1, the reference character 10 denotes generally a universal coupling or fitting embodying this invention. Preferably, this fitting is made of a ductile metal such as aluminum, copper and the like. This fitting has substantially uniform outer diameter throughout its axial length. Reversely, axially extending bores or bore portions 11 and 12 of equal diameter and like length are provided at the opposite ends of the fitting 10. These two bore or bore portions are co-axial and terminate short of each other, in the embodiment shown, being separated by dividing wall or partition 13, although this partition may be eliminated and, if desired, replaced by abutments. The holes or bores or bore portions 11 and 12 prior to use may be filled with a protective sealant 14 which may be retained in place by frangible end caps 15 and 16 of suitable material such as synthetic plastic. The function of these end caps 15 and 16 is to maintain the protective sealant 14 within the respective bores 11 and 12 until the fitting is put into use. Each is readily removed or may be pierced in situ by the conductors, e.g. cable 17 and wire 18 which the coupling 10 is intended to join. The noteworthy fact with respect to the fitting 10 just described is the equality of the dimensions of the two bores or bore portions 11 and 12.

A coupling 10 of the character just described is useful in joining conductors such as cables or wires of different or the same diameters differing, for example, with a diameter ratio of as much as about 3:1, and ratios in excess of 3:1 when special crimping tools are used.

In utilizing a connector or coupling 10 to join two conductors 17 and 18 the following procedure may be followed:

Conductor 17 has its bared end 17a forced through the frangible cap 15 into the bore 11. In some cases, the connector is supplied without sealant and end caps, or they may be supplied at the job site. Sometimes it is desirable to remove the caps before assembly. Such action causes ejection from the bore of a substantial amount of its sealant content 14. When the end 17a of conductor 17 abuts the partition wall 13 or an appropriate abutment a crimping tool (not shown) is applied to the coupling member 10 so that its jaws compress the portion thereof overlying the bore or bore-portion 11. These jaws are so shaped as to depress or deform the wall of coupling 10 into tight and intimate rib-like folds 10a whose bottoms press against the surfaces of the conductor 17 within the bore 11. The folding of the wall as it occurs provides high point or line pressure between the contacting portions of the bottom of the beam sections 10b between ribs and the surface of the wire within the bore 11 and this acts to break up the oxide film on the surface of the conductor 17 and thus insure good electrical contact between the engaging surfaces. In addition, the inner surfaces of beam sections 10b lie tightly against the conductor when it expands as it heats up. The radial expansion of the conductor exerts tightening pressure outwardly against the inner surfaces 10b of the beam-like sections and on contraction with cooling these sections still maintain tight contact with the conductor surface. As a result there is no tendency for loosening of the joint between the conductor and the connector even during extreme ranges of thermal variation.

When the first conductor had been joined to the connector as just described, the second conductor 18 which, in the embodiment shown, has considerably smaller diameter, has its bared end 18a similarly forced through the end cap 16 into the opening or bore 12 until it abuts partition 13 or an abutment on the inner seal of the other conductor. The same crimping tool is then utilized to fold and compress the wall of the connector overlying the bore 12 into intimate contact with the surface of wire 18. The ribs 10c formed by this compression are more accentuated and the beam sections 10d between ribs also bear against the surface of the smaller diametered conductor 18, again breaking up its oxide film and insuring good electrical contact. Also, the highly accentuated beam sections 10d tie tightly against the conductor 18 and the latter may expand radially against their inner surfaces. These sections also tend to retain the contact with the conductor surface on contraction with cooling. The sealant 14, if any, remaining within the bore 12 after the wire 18 pierces it initially and likewise that within the bore 11 both are further partially extruded during crimping action along the spacing passages 10e and 10f between the respective folds, thus avoiding entrapment and pressure build-up of such sealant which as mentioned above would prevent proper electrical contact between the joined parts. The pressure exerted by the crimping tool is frequently sufficient, after initial formation of these passages 10e and 10f to obliterate them by a flow of metal of the connector to fill these spaces after they have completed their function as described.

It is to be noted that the axial or longitudinal extension or direction of the spaces or escape glands 10e or 10f resulting from practice of the instant invention provides for the hydraulic relief or escape of excess sealant during crimping. This is in contrast with conventional application of a circumferentially extending crimp which caused undesired hydraulic build-up of sealant as it had no escape and furthermore which did not provide similar strength against relaxation of contact.

Although the longitudinal crimping action herein shown provides four folds in the connector walls and the respective conductors, change in the configuration of the crimping tool could provide fewer or larger numbers of folds. In addition, other variations within the scope of the appended claims are possible and are contemplated. There is no intention therefore of limitation to the exact details shown and described.

What is claimed is:

1. In combination an electrical conductor and a ductile metal joining member having at least one bore portion, an end portion of said conductor disposed in said bore portion, said member being crimped about the length of said conductor in its respective bore portion in four radially opposed continuous longitudinally directed ribs and internal beam-like sectioned folds in intimate holding contact with the longitudinally extending portion of the surface of said conductor end portion along a substantial portion of the length of said bore portion.

2. In combination a pair of conductors and a ductile metal joining member having a bore portion extending therethrough, end portions of said conductors disposed in said bore portion, said member being crimped about the respective lengths of said conductors in its bore portion in four radially opposed continuous longitudinally directed ribs and internal beam-like sectioned folds in intimate resiliently compressive holding contact with longitudinally extending portions of the surface of said conductor end portions along a substantial portion of the lengths of said bore portion.

3. In combination a pair of conductors and a ductile metal joining member having a pair of opposed cylindrical bore portions, a barrier member in said joining member interposed between said bore portions, end portions of said conductors disposed in said bore portions, said member being crimped about the respective lengths of said conductors in its respective bore portions in continuous longitudinally directed ribs and radially opposed internal beam-like sectioned folds having a convex cross-section in intimate resiliently compressive holding contact with longitudinally extending portions of the surface of said conductor end portions along a substantial portion of the lengths of said bore portions, said opposed folds maintaining said holding contact against variations in the diameter of said conductors due to temperature changes and being capable of joining conductors having relative diameters in the range of from a ratio of 1:1 to about 3:1.

4. The method of joining electrical conductors in a ductile metal sleeve having a pair of opposed bores therein and an interior center barrier and being filled with a contact sealant composition, comprising the steps of inserting the ends of said conductors in opposite ends of said sleeve into abutment with said barrier, crimping said sleeve longitudinally on each side of said barrier along a substantial portion of the lengths of said bores and causing the metal of said sleeve to flow against the inserted ends of said conductors in radially opposed continuous ribs and beam-like sectioned folds in compressive holding contact with said ends while releasing the hydraulic pressure of said sealant within said sleeve by permitting its escape therefrom between said folds during crimping.

References Cited in the file of this patent

UNITED STATES PATENTS

| | | |
|---|---|---|
| 2,002,220 | Douglas | May 21, 1935 |
| 2,226,849 | Douglas | Dec. 31, 1940 |
| 2,535,013 | Freedom | Dec. 19, 1950 |
| 2,635,133 | Badeau | Apr. 14, 1953 |
| 2,696,518 | Roehmann et al. | Dec. 7, 1954 |

OTHER REFERENCES

Publication I "Crimpit," Bulletin CR-57, published by Burndy Corporation, August 1957, pages 12 and 13 relied on.